US012789416B2

(12) United States Patent
Ciccu et al.

(10) Patent No.: US 12,789,416 B2
(45) Date of Patent: Nov. 10, 2026

(54) PUNCH FORMING A COMPOSITE CHARGE

(71) Applicant: The Boeing Company, Arlington, VA (US)

(72) Inventors: Marco Tullio B. Ciccu, Seattle, WA (US); Michael Alan Lee, Kent, WA (US); Sandra Louise Zmeu, Shoreline, WA (US); David William Lucas, Maple Valley, WA (US); Steven Joseph Plummer, Seattle, WA (US)

(73) Assignee: The Boeing Company, Arlington, VA (US)

(*) Notice: Subject to any disclaimer, the term of this patent is extended or adjusted under 35 U.S.C. 154(b) by 66 days.

(21) Appl. No.: 18/649,638

(22) Filed: Apr. 29, 2024

(65) Prior Publication Data

US 2025/0332763 A1 Oct. 30, 2025

(51) Int. Cl.
*B29C 33/20* (2006.01)
*B29C 70/56* (2006.01)

(52) U.S. Cl.
CPC .............. *B29C 33/20* (2013.01); *B29C 70/56* (2013.01)

(58) Field of Classification Search
CPC ...................................................... B29C 33/20
See application file for complete search history.

(56) References Cited

U.S. PATENT DOCUMENTS

| | | | |
|---|---|---|---|
| 7,527,759 B2 | 5/2009 | Lee et al. | |
| 7,655,168 B2 | 2/2010 | Jones et al. | |
| 7,708,546 B2 | 5/2010 | Lee et al. | |
| 11,285,641 B2 | 3/2022 | Plummer et al. | |
| 2010/0102482 A1 | 4/2010 | Jones et al. | |
| 2013/0105072 A1* | 5/2013 | Anderson | B32B 38/0004 156/264 |
| 2015/0118345 A1 | 4/2015 | Cruzado Parla et al. | |
| 2016/0016366 A1 | 1/2016 | Robins et al. | |
| 2021/0107238 A1 | 4/2021 | Saini et al. | |
| 2022/0048240 A1* | 2/2022 | Globerman | B29C 53/84 |
| 2022/0080683 A1 | 3/2022 | Plummer et al. | |
| 2023/0256663 A1 | 8/2023 | Plummer et al. | |
| 2023/0278297 A1 | 9/2023 | Carlson et al. | |

OTHER PUBLICATIONS

European Patent Office Extended Search Report, dated Aug. 26, 2025, regarding Application No. EP25159986.6, 10 pages.

* cited by examiner

*Primary Examiner* — Alison L Hindenlang
*Assistant Examiner* — Alexander A Wang
(74) *Attorney, Agent, or Firm* — Yee & Associates, P.C.

(57) ABSTRACT

Methods of punch forming a composite charge are presented. A forming tool is placed in contact with a composite charge. A plurality of actuators connected to the forming tool is simultaneously activated to drive the forming tool towards the composite charge. The plurality of actuators is driven at a plurality of rates to generate a variable cross-section in the composite charge. The plurality of actuators is simultaneously stopped.

22 Claims, 12 Drawing Sheets

PUNCH FORMING A COMPOSITE CHARGE

BACKGROUND INFORMATION

1. Field

The present disclosure relates generally to composite manufacturing and more specifically to a method of forming a composite structure with a variable cross-section.

2. Background

Historically, composite stringers for commercial aircraft applications have been designed with a constant cross section along the spanwise direction. Constant cross-section composite stringers can be created using traditional methods of punch forming.

Designs for future aircraft could benefit from tapered stringer cross-sections. Tapered stringer cross-sections could at least one of reduce the weight of the stringer or improve performance. However, traditional methods of composite stringer punch forming do not account for a taper in a cross-section.

Therefore, it would be desirable to have a method and apparatus that takes into account at least some of the issues discussed above as well as other possible issues. For example, it would be desirable to have a punch forming method that can produce a tapered cross-section.

SUMMARY

An embodiment of the present disclosure provides a method of punch forming a composite charge. A forming tool is placed in contact with a composite charge. A plurality of actuators connected to the forming tool is simultaneously activated to drive the forming tool towards the composite charge. The plurality of actuators is driven at a plurality of rates to generate a variable cross-section in the composite charge. The plurality of actuators is simultaneously stopped.

An embodiment of the present disclosure provides a punch forming system for a variable cross-section. The punch forming system comprises a charge support, a forming tool, and a plurality of actuators. The charge support is configured to support a composite charge during forming of the composite charge, the forming tool positioned over the charge support, the forming tool comprises a forming surface and a backside, and the plurality of actuators is connected to the backside of the forming tool and configured to operate at a plurality of rates to form a composite charge between the forming surface and the charge support.

Another embodiment of the present disclosure provides a method of punch forming a composite charge. A composite charge is placed onto a charge support. A forming tool is driven against the composite charge towards the charge support using a plurality of actuators at a plurality of rates to generate a variable cross-section in the composite charge. The plurality of actuators is simultaneously stopped.

Yet another embodiment of the present disclosure provides a method of punch forming a composite charge. A forming tool is placed in contact with a composite charge. A plurality of actuators connected to the forming tool is simultaneously activated to drive the forming tool towards the composite charge. The plurality of actuators is driven a plurality of stroke lengths to generate a variable cross-section in the composite charge. The plurality of actuators is simultaneously stopped.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account several considerations. The illustrative embodiments recognize and take into account that volumetric changes of a stringer cross-section can produce material excess along the length of the part and can induce wrinkles and other inconsistencies. The illustrative examples recognize and take into account the excess material along the tapered geometry. The illustrative examples provide a novel approach to account for material excess to improve part producibility.

The illustrative examples recognize and take into account that traditional methods of punch forming for stringers have a constant speed of forming for a constant cross section. The illustrative examples recognize and take into account that traditional methods of punch forming have a constant speed such that the material starts and ends the forming cycle simultaneously. The illustrative examples recognize and take into account that the constant speed provides a uniform constraint in the laminate to manage part quality.

To create a tapered cross section, the illustrative examples provide a forming routine that compensates for the geometric change along the length. The illustrative examples compensate for the geometric change by forming at variable speeds so that the part starts forming and finishes forming concurrently. The illustrative examples provide the same uniform constraint condition as a constant cross section would throughout the forming cycle.

The illustrative examples form the material at a variable rate such that the material is constrained throughout the entirety of the forming process. The illustrative examples provide equipment to operate in a manner that provides variable rates. The illustrative examples provide equipment with motion control and programming capability. The illustrative examples provide equipment with variable-rate forming capability. In the illustrative examples, each actuator longitudinally placed along the forming die is able to punch a cross section size different from a neighboring cross section in the same time span as the neighboring cross section. The illustrative examples utilize tapered forming dies.

Figure 1:
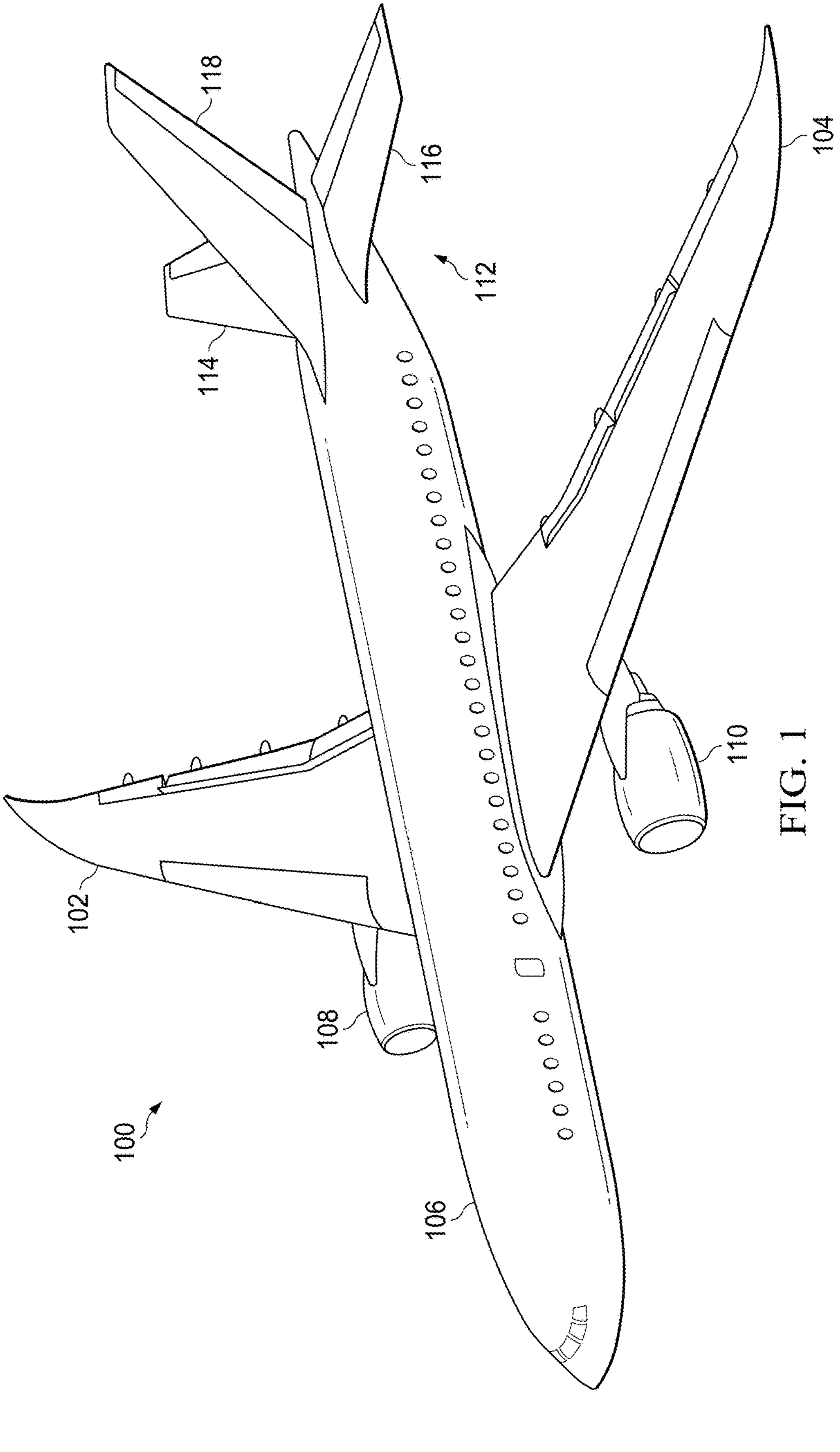
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite parts manufactured using at least one of the punch forming methods and punch forming system of the illustrative examples. A composite part of at least one of wing 102, wing 104, or body 106 can be formed using at least one of the punch forming methods and punch forming system of the illustrative examples. For example, a stringer of at least one of wing 102, wing 104, or body 106 can be formed using at least one of the punch forming methods and punch forming system of the illustrative examples.

Figure 2:
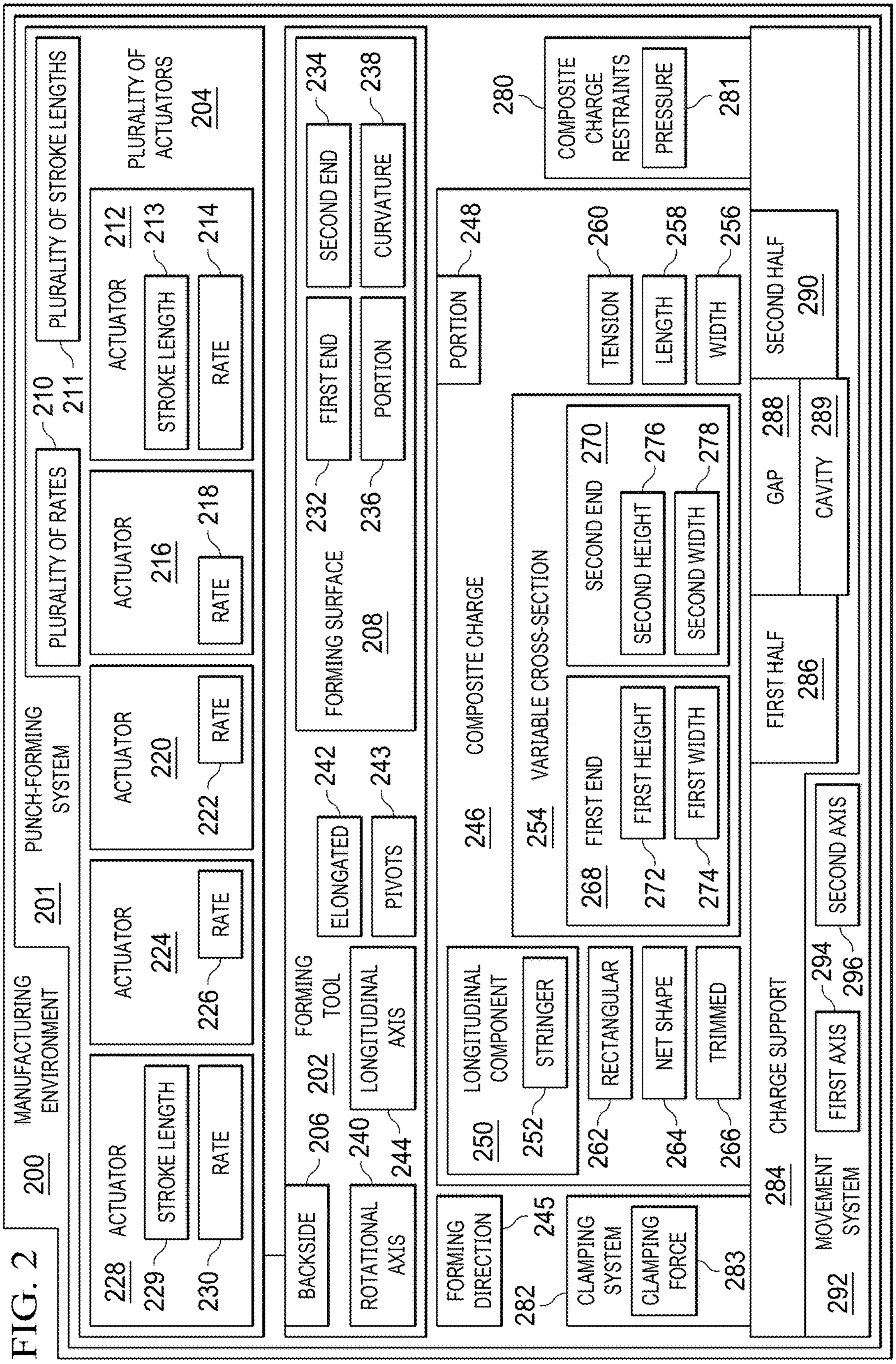
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Punch forming system 201 can be used to punch form composite charge 246 to form variable cross-section 254.

Punch forming system 201 for a variable cross-section 254 comprises charge support 284, forming tool 202, and plurality of actuators 204. Charge support 284 is configured to support composite charge 246 during forming of composite charge 246. Forming tool 202 is positioned over charge support 284. In some illustrative examples, forming tool 202 can be referred to as elongated 242. Forming tool 202 comprises forming surface 208 and backside 206. Plurality of actuators 204 is connected to backside 206 of forming tool 202 and configured to operate at plurality of rates 210 to form composite charge 246 between forming surface 208 and charge support 284. During forming, plurality of actuators 204 move at plurality of rates 210 so that forming completes at same time.

Plurality of actuators 204 are spread across backside 206 of forming tool 202 along longitudinal axis 244 of forming tool 202. Longitudinal axis 244 runs from first end 232 to second end 234 of forming tool 202. In some illustrative examples, plurality of actuators 204 are arranged in a line on backside 206 of forming tool 202. Plurality of actuators 204 is arranged such that each actuator of plurality of actuators 204 moves a respective portion of forming tool 202. Plurality of actuators 204 comprises any desirable quantity of actuators. In this illustrative example, plurality of actuators 204 comprises actuator 212, actuator 216, actuator 220, actuator 224, and actuator 228.

As depicted, actuator 228 is closest to first end 232 of forming tool 202. As depicted, actuator 212 is closest to second end 234 of forming tool 202. Actuator 224, actuator 220, and actuator 216 extend between actuator 228 and actuator 212. Each actuator of plurality of actuators 204 has a respective rate of plurality of rates 210. Actuator 212 operates at rate 214, actuator 216 operates at rate 218, actuator 220 operates at rate 222, actuator 224 operates at rate 226, and actuator 228 operates at rate 230. Each of plurality of rates 210 for plurality of actuators 204 is independently set based on variable cross-section 254 to be formed into composite charge 246.

Rate 230 is different than rate 214. In some illustrative examples, rate 230 is greater than rate 214. In some illustrative examples, rate 214 is greater than rate 230. When a cross-section of forming tool 202 at first end 232 is greater than a cross-section at second end 234, rate 230 is greater than rate 214. In some illustrative examples, actuators between actuator 228 and actuator 212 have a range of rates. In some illustrative examples, rate 226, rate 222, and rate 218 are in a range between rate 214 and rate 230.

To form composite charge 246, plurality of actuators 204 connected to forming tool 202 is simultaneously activated to drive forming tool 202 towards composite charge 246. Plurality of actuators 204 is driven at plurality of rates 210 to generate variable cross-section 254 in composite charge 246. Plurality of actuators 204 is simultaneously stopped. Plurality of rates 210 is influenced by curvature 238 of forming surface 208. Curvature 238 is configured to generate variable cross-section 254 in composite charge 246.

Plurality of actuators 204 is distributed along longitudinal axis 244 of forming tool 202. Driving plurality of actuators 204 at plurality of rates 210 to generate variable cross-section 254 in composite charge 246 comprises driving plurality of actuators 204 plurality of stroke lengths 211 along longitudinal axis 244 to generate variable cross-section 254 in composite charge 246. Plurality of actuators 204 is driven plurality of stroke lengths 211 to generate variable cross-section 254 in composite charge 246. Due to plurality of stroke lengths 211, one end of forming surface 208 moves farther than the other of forming surface 208.

Driving plurality of actuators 204 at plurality of stroke lengths 211 forms composite charge 246 into a shape having first height 272 at first end 268 and second height 276 at second end 270. Second height 276 is different than first height 272. When second height 276 is greater than first height 272, stroke length 213 of actuator 212 is greater than stroke length 229 of actuator 228. When second height 276 is greater than first height 272, second end 234 is moved farther than first end 232.

In some illustrative examples, plurality of actuators 204 can include actuators of different lengths. In these illustrative examples, plurality of actuators 204 can be completely retracted prior to beginning punch forming.

In other illustrative examples, plurality of actuators 204 can include one length of actuator, wherein each actuator is extended a different distance prior to forming composite charge 246. In these illustrative examples, plurality of actuators 204 is initially extended a plurality of different lengths. In these illustrative examples, some actuators of plurality of actuators 204 are partially extended prior to beginning punch forming.

To punch form composite charge 246, forming tool 202 is placed in contact with composite charge 246. In some illustrative examples, placing forming tool 202 in contact with composite charge 246 comprises placing forming tool 202 in contact with an entire length, length 258, of composite charge 246. In some illustrative examples, forming tool 202 is in contact with a centerline of composite charge 246. In some illustrative examples, forming tool 202 is in contact with a region of composite charge 246 that will form a cap region of stringer 252.

Plurality of actuators 204 connected to forming tool 202 is simultaneously activated to drive forming tool 202 in forming direction 245 towards composite charge 246. Plurality of actuators 204 is driven at plurality of rates 210 to generate variable cross-section 254 in composite charge 246. Plurality of actuators 204 is simultaneously stopped.

In some illustrative examples, driving plurality of actuators 204 at plurality of rates 210 to generate variable cross-section 254 in composite charge 246 comprises forming composite charge 246 into a shape having first height 272 at first end 268 and second height 276 at second end 270. Second height 276 is different than first height 272. When second height 276 is greater than first height 272, rate 214 of actuator 212 is greater than rate 230 of actuator 228. When second height 276 is greater than first height 272, second end 234 is moved faster than first end 232.

In some illustrative examples, driving plurality of actuators 204 at plurality of rates 210 to generate variable cross-section 254 in composite charge 246 comprises forming composite charge 246 into a shape having first width 274 at first end 268 and second width 278 at second end 270, wherein second width 278 is different than first width 274. In some illustrative examples, variable cross-section 254 is symmetric.

In some illustrative examples, forming variable cross-section 254 comprises at least partially restraining portions of composite charge 246 to maintain tension 260 in composite charge 246 while driving plurality of actuators 204.

Driving plurality of actuators 204 at plurality of rates 210 to generate variable cross-section 254 in composite charge 246 comprises rotating forming tool 202 about rotational axis 240 parallel to width 256 of composite charge 246. By driving plurality of actuators 204 at plurality of rates 210 to generate variable cross-section 254, forming tool 202 pivots 243 about rotational axis 240. In some illustrative examples, first end 232 moves farther than second end 234 as forming tool 202 pivots 243. In these illustrative examples, by pivoting forming tool 202 around rotational axis 240, first end 232 moves faster than second end 234 of forming tool 202 in forming direction 245. In some illustrative examples, second end 234 moves farther than first end 232 as forming tool pivots 243. In these illustrative examples, by pivoting forming tool 202 around rotational axis 240, second end 234 moves faster than first end 232 of forming tool 202 in forming direction 245. Pivoting forming tool 202 during forming of composite charge 246 reduces wrinkling during forming. Rotational axis 240 is perpendicular to both longitudinal axis 244 of forming tool 202 and forming direction 245 of movement of forming tool 202.

In some illustrative examples, charge support 284 comprises cavity 289 for forming composite charge 246. In some illustrative examples, cavity 289 is a set size. In some illustrative examples, charge support 284 is fixed. In other illustrative examples, cavity 289 of charge support 284 is adjustable.

In some illustrative examples, charge support 284 comprises first half 286 and second half 290 with gap 288 between first half 286 and second half 290. In some illustrative examples, charge support 284 comprises first half 286 and second half 290, wherein at least one of first half 286 or second half 290 is configured to move away from the other of first half 286 or second half 290 to enable forming of composite charge 246.

In some illustrative examples, punch forming system 201 comprises movement system 292 connected to charge support 284 and configured to allow movement of at least one of first half 286 or second half 290 in more than one axis. Movement system 292 can take any desirable form. In some illustrative examples, movement system 292 can comprise one of bearings, wheels, rails, or any other desirable movement component. In some illustrative examples, movement system 292 allows movement along first axis 294 to allow first half 286 and second half 290 to move away from each other. In some illustrative examples, movement system 292 allows movement along second axis 296 to allow different distances between first half 286 and second half 290 at different locations along longitudinal axis 244 of forming tool 202. In some illustrative examples, movement system 292 allows for first half 286 and second half 290 to "fan" relative to each other.

In some illustrative examples, punch forming system 201 comprises clamping system 282 configured to compress portion 248 of composite charge 246 against portion 236 of forming tool 202 during forming of composite charge 246. In some illustrative examples, clamping system 282 constrains composite charge 246 in a cap region. In some illustrative examples, portion 248 is a centerline of composite charge 246. In some illustrative examples, prior to forming variable cross-section 254, clamping force 283 is applied to compress a portion 248 of composite charge 246 against forming tool 202 prior to driving plurality of actuators 204.

In some illustrative examples, punch forming system 201 comprises composite charge restraints 280 configured to maintain tension 260 in composite charge 246 during forming of composite charge 246 by applying pressure 281 against composite charge 246 and towards one of either forming tool 202 or charge support 284. Composite charge restraints 280 take any desirable form. In some illustrative examples, composite charge restraints 280 take the form of at least one of clamps or inflatable bladders.

Composite charge 246 with variable cross-section 254 can be referred to as longitudinal component 250. In some illustrative examples, longitudinal component 250 takes the form of stringer 252.

In some illustrative examples, composite charge 246 is trimmed 266 after forming variable cross-section 254. In some of these illustrative examples, composite charge 246 can be rectangular 262 when composite charge 246 is placed onto charge support 284.

In some illustrative examples, composite charge 246 is net shape 264 prior to forming. In these illustrative examples, composite charge 246 is not trimmed 266 after forming variable cross-section 254. Composite charge 246 can be laid up to net shape 264 or trimmed 266 to net shape 264 prior to placing composite charge 246 on charge support 284.

The illustration of manufacturing environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, plurality of actuators 204 has more than five actuators. In some illustrative examples, forming tool 202 can be segmented. In some illustrative examples, forming tool 202 comprises a plurality of segments, each segment connected to a respective actuator of plurality of actuators 204.

Figure 3:
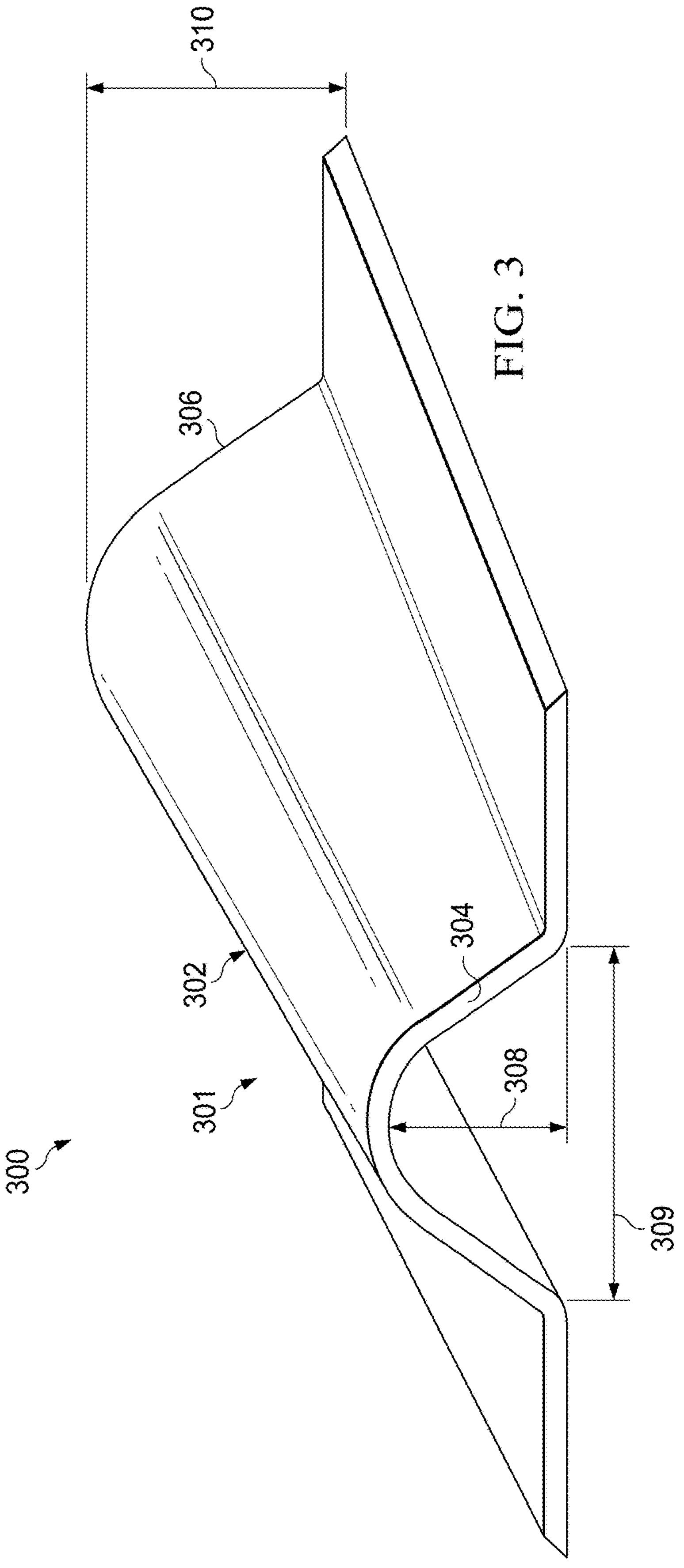
FIG. 3 is an illustration of an isometric view of a longitudinal component that can be manufactured using punch forming in accordance with an illustrative embodiment.

Turning now to FIG. 3, an illustration of an isometric view of a longitudinal component that can be manufactured using punch forming is depicted in accordance with an illustrative embodiment. Longitudinal component 301 is a physical implementation of longitudinal component 250 formed from composite charge 246 of FIG. 2. In this illustrative example, longitudinal component 301 takes the form of a hat-shaped stringer. Variable cross-section 302 of longitudinal component 301 can be formed using punch forming system 201 of FIG. 2.

Variable cross-section 302 has first end 304 and second end 306. First end 304 has first height 308 and first width 309. Second end 306 has second height 310 and second width (not visible). In this illustrative example, first height 308 and second height 310 are different. In some illustrative examples, first width 309 and the second width are different. In this illustrative example, second height 310 is greater than first height 308.

Figure 4:
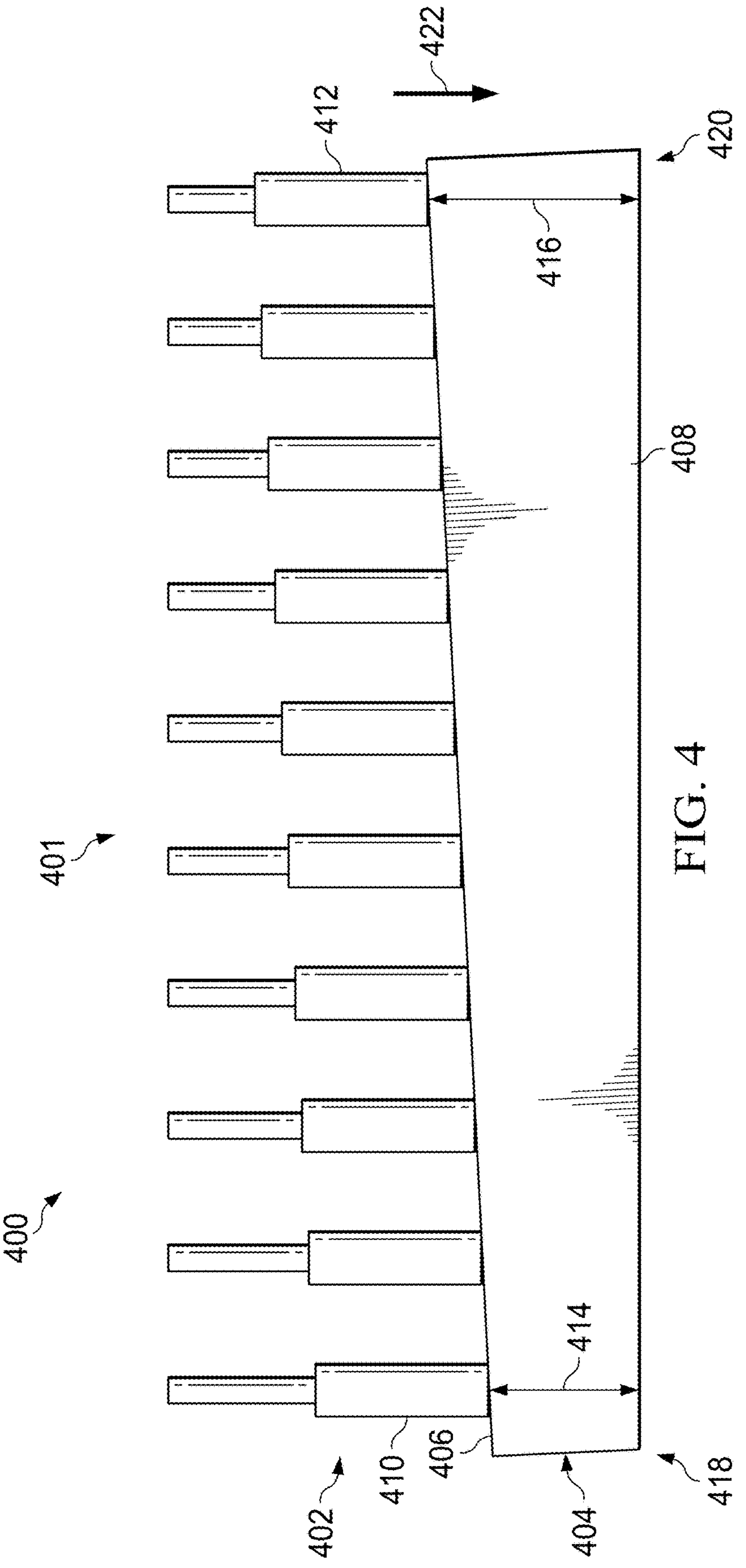
FIG. 4 is an illustration of a side view of a schematic of a forming tool and plurality of actuators for punch forming in accordance with an illustrative embodiment.

Turning now to FIG. 4, an illustration of a side view of a schematic of a forming tool and plurality of actuators for punch forming is depicted in accordance with an illustrative embodiment. Forming tool 404 of a punch forming system is visible in view 400. Forming tool 404 is a physical implementation of forming tool 202 of FIG. 2. Plurality of actuators 402 is a physical implementation of plurality of actuators 204 of FIG. 2. Forming tool 404 can be used to form a composite charge into longitudinal component 301 having variable cross-section 302.

Forming tool 404 has backside 406 and forming surface 408. Plurality of actuators 402 is connected to backside 406 of forming tool 404. In this illustrative example, plurality of actuators 402 comprises ten actuators. Plurality of actuators 402 can comprise any desirable quantity of actuators.

In this illustrative example, actuator 410 is positioned farthest at first end 418 of forming tool 404. In this illustrative example, actuator 412 is positioned farthest at second end 420. In some illustrative examples, actuator 410 can be referred to as a first actuator and actuator 412 can be referred to as a last actuator.

In this illustrative example, at first end 418, backside 406 is first distance 414 away from forming surface 408. In this illustrative example, at second end 420, backside 406 is second distance 416 away from forming surface 408. A difference in thickness of forming tool 404 from first end 418 to second end 420 generates a variable cross-section in a composite charge during punch forming.

In view 400, forming tool 404 is positioned at first orientation 401. First orientation 401 can be an orientation for forming tool 404 prior to punch forming a composite charge. In first orientation 401, forming surface 408 is positioned such that a portion of forming surface 408 contacts a portion of a composite charge. In first orientation 401, forming surface 408 is positioned to contact a composite charge along the whole length of the composite charge. In view 400, plurality of actuators 402 are positioned such that forming surface 408 is held in a substantially planar position. In view 400, plurality of actuators 402 is initially extended a plurality of different lengths. In view 400, some actuators of plurality of actuators 402 are partially extended prior to beginning punch forming. To form a composite charge, forming tool 404 is moved in direction 422. Direction 422 is towards a composite charge.

Figure 5:
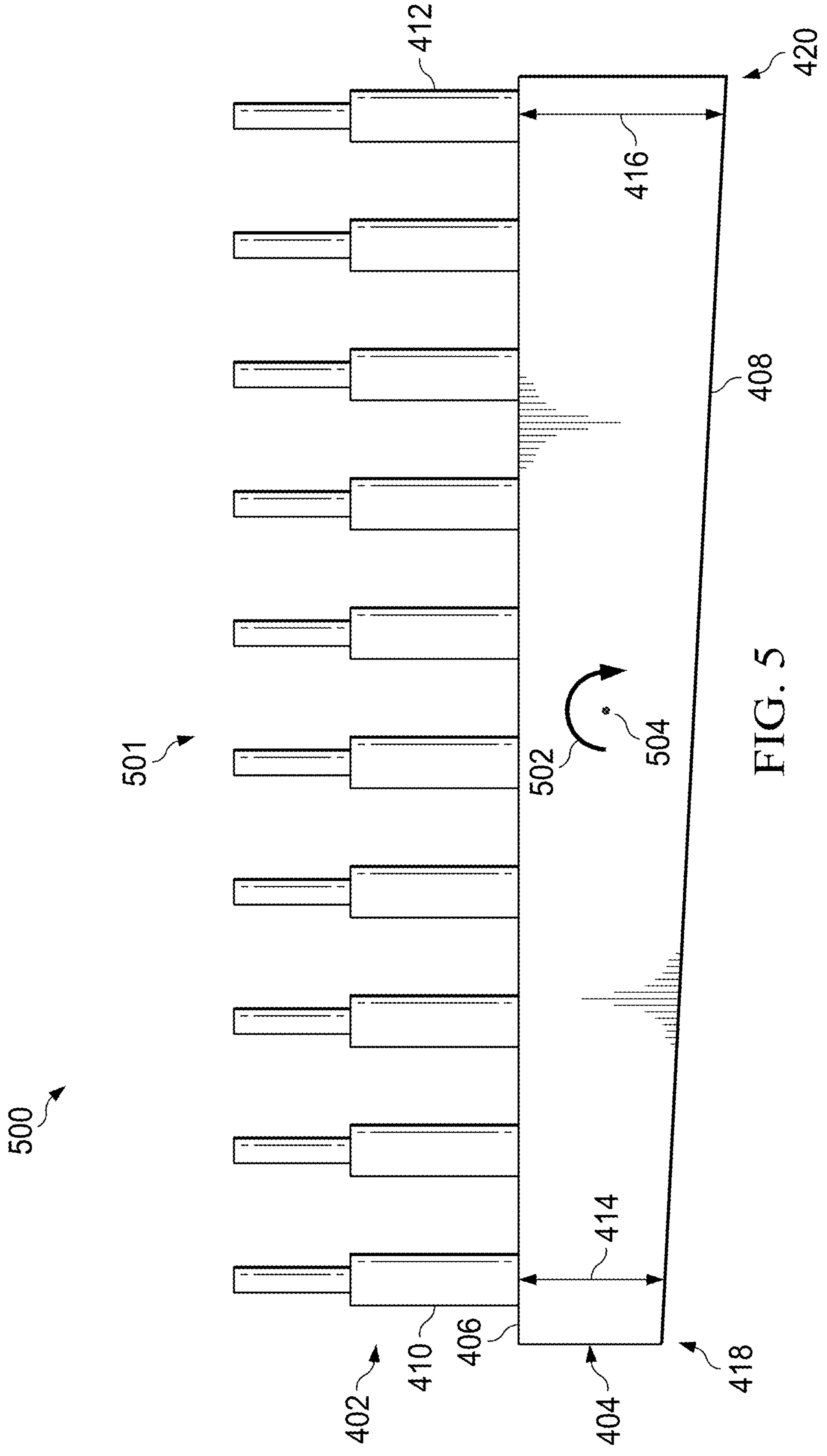
FIG. 5 is an illustration of a side view of a schematic of a forming tool and plurality of actuators for punch forming in accordance with an illustrative embodiment.

Turning now to FIG. 5, an illustration of a side view of a schematic of a forming tool and plurality of actuators for punch forming is depicted in accordance with an illustrative embodiment. In view 500, forming tool 404 is in second orientation 501. In some illustrative examples, second orientation 501 is an orientation for forming tool 404 following punch forming a composite charge. Between first orientation 401 and second orientation 501, plurality of actuators 402 have moved at a plurality of rates. In view 400, plurality of actuators 402 were extended a plurality of distances. Between view 400 and view 500, plurality of actuators 402 has been extended a plurality of stroke lengths. In view 500, plurality of actuators 402 are extended a same amount. Between view 400 and view 500, plurality of actuators 402 initiated and stopped movement simultaneously. Between view 400 and view 500, actuator 412 moved faster than actuator 410.

Between view 400 and view 500, forming tool 404 has pivoted in direction 502. By pivoting forming tool 404 in direction 502, second end 420 moves further than first end 418 in direction 422. By pivoting forming tool 404 in direction 502, second end 420 moves faster than first end 418 of forming tool 404. Pivoting forming tool 404 during forming of a composite charge reduces wrinkling during forming.

In this illustrative example, forming tool 404 is pivoted in direction 502 about rotational axis 504. Rotational axis 504 extends into and out of the page. Rotational axis 504 is perpendicular to both a longitudinal axis of forming tool 404 and direction 422 of movement of forming tool 404.

In this illustrative example, plurality of actuators 402 have a same length. In other non-depicted examples, plurality of actuators 402 can have different lengths. In some illustrative examples, each of plurality of actuators 402 with different lengths are fully retracted in view 400 and each of plurality actuators 402 is fully extended in view 500.

Figure 6:
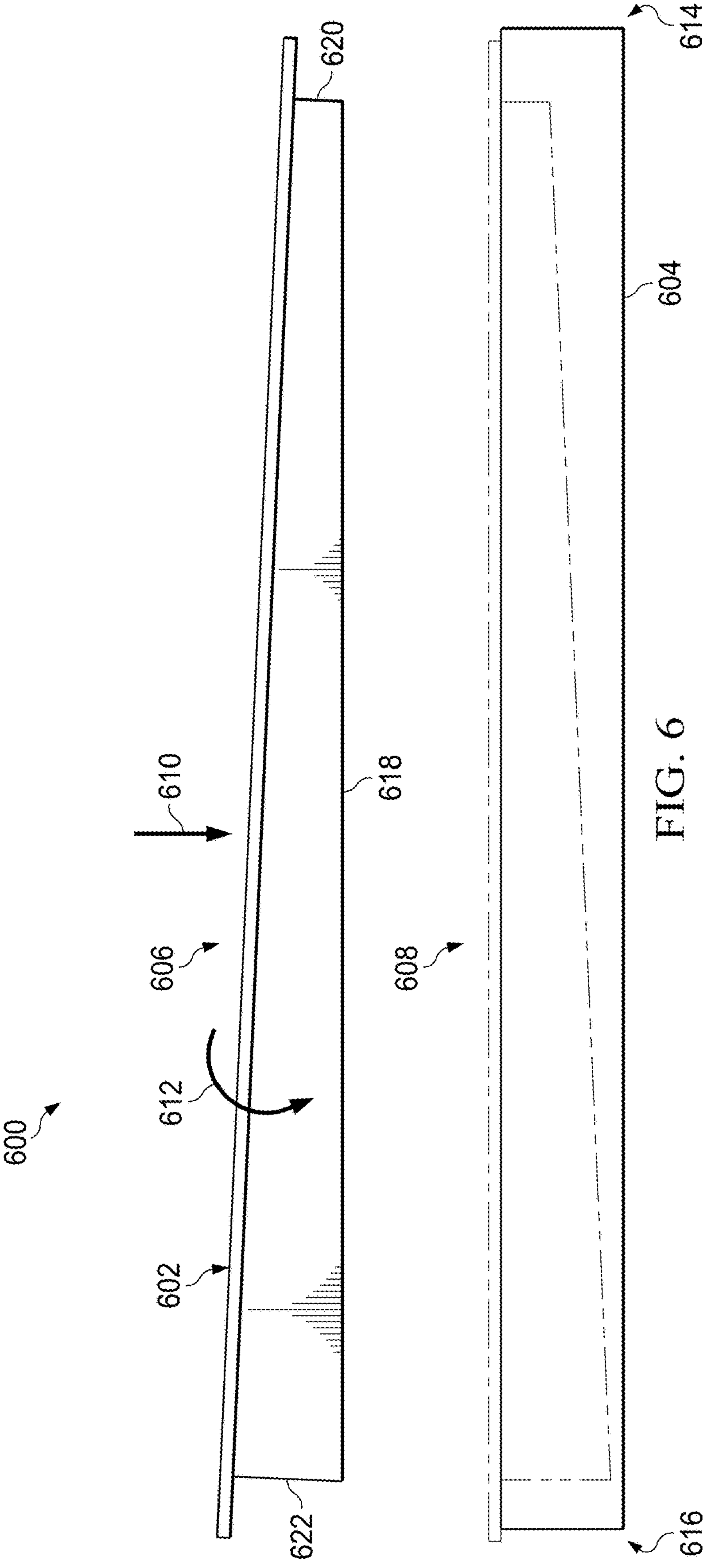
FIG. 6 is an illustration of a side view of a schematic of a forming tool relative to a charge support prior to and following punch forming in accordance with an illustrative embodiment.

Turning now to FIG. 6, an illustration of a side view of a schematic of a forming tool relative to a charge support prior to and following punch forming is depicted in accordance with an illustrative embodiment. Forming tool 602 and charge support 604 can be physical implementations of forming tool 202 and charge support 284 of FIG. 2. Forming tool 602 and charge support 604 can be used to form longitudinal component 301 of FIG. 3. Forming tool 602 can be the same as forming tool 404 of FIGS. 4 and 5.

In view 600, forming tool 602 is depicted in first orientation 606 and second orientation 608 relative to charge support 604. In first orientation 606, forming tool 602 is prepared to begin forming a composite charge on charge support 604. First orientation 606 is depicted elevated above charge support 604. Prior to beginning forming the composite charge, forming tool 602 is moved in direction 610 to place forming tool 602 in contact with the composite charge in first orientation 606. In this illustrative example, in first orientation 606 forming tool 602 is positioned such that forming surface 618 has a substantially flat presentation. In first orientation 606, forming surface 618 of forming tool 602 is parallel to the composite charge. In first orientation 606, a distance from forming surface 618 of forming tool 602 to charge support 604 is a same distance along the longitudinal axis of charge support 604. In first orientation 606, a distance from forming surface 618 of forming tool 602 to charge support 604 is a same distance from first end 614 to second end 616. In this illustrative example, first end 620 of forming tool 602 is a same distance away from first end 614 of charge support 604 as second end 622 of forming tool 602 from second end 616 of charge support 604.

In second orientation 608, forming tool 602 has formed a variable cross-section into a composite charge on charge support 604. In second orientation 608, forming surface 618 of forming tool 602 is angled relative to charge support 604. Between first orientation 606 and second orientation 608, forming tool 602 has moved in direction 610. Direction 610 is downward toward charge support 604. In forming a composite charge forming tool 602 pivots in direction 612. By pivoting forming tool 602 in direction 612, second end 622 moves further in direction 610 than first end 620. By pivoting forming tool 602 in direction 612, second end 622 moves faster than first end 620 of forming tool 602. Pivoting forming tool 602 during forming of a composite charge reduces wrinkling during forming.

Figure 7:
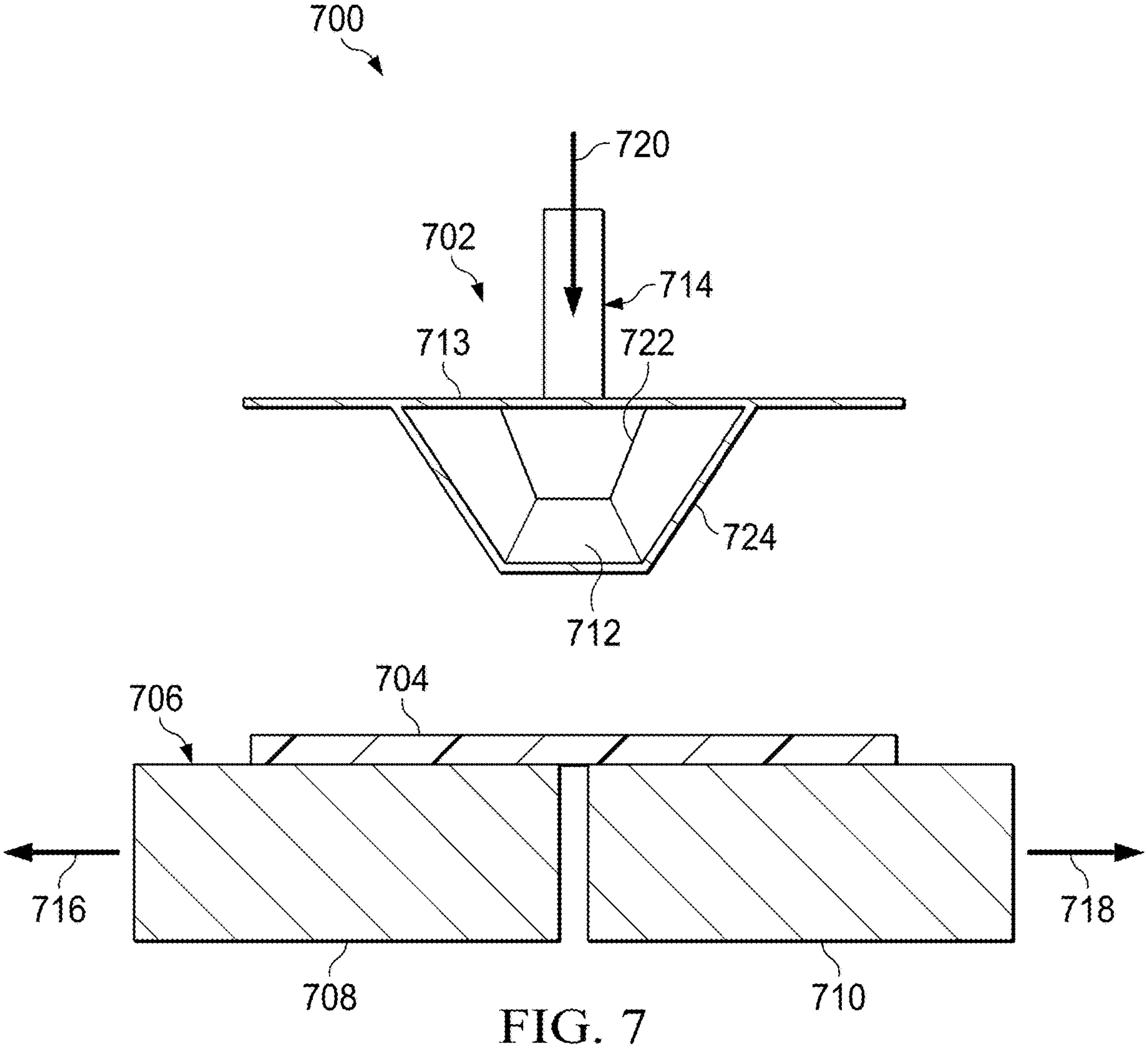
FIG. 7 is an illustration of a front view of a schematic of a forming tool and a charge support prior to punch forming in accordance with an illustrative embodiment.

Turning now to FIG. 7, an illustration of a front view of a schematic of a forming tool and a charge support prior to punch forming is depicted in accordance with an illustrative embodiment. Forming tool 702 and charge support 706 can be physical implementations of forming tool 202 and charge support 284 of FIG. 2. Forming tool 702 and charge support 706 can be used to form longitudinal component 301 of FIG. 3. Forming tool 702 can be the same as forming tool 404 of FIGS. 4 and 5. View 700 can be a front view of forming tool 602 and charge support 604 of FIG. 6.

In view 700, forming tool 702 is positioned above composite charge 704 on charge support 706. In this illustrative example, charge support 706 comprises first half 708 and second half 710. In this illustrative example, a gap between first half 708 and second half 710 can change during the forming of composite charge 704.

At least one of first half 708 or second half 710 is configured to move away from the other of first half 708 or second half 710 to enable forming of composite charge 704. In this illustrative example, first half 708 is configured to move in direction 716 away from second half 710. In this illustrative example, second half 710 is configured to move in direction 718 away from first half 708.

Although not depicted in view 700, a movement system is connected to charge support 706 to allow movement of at least one of first half 708 or second half 710. In some illustrative examples, the movement system is configured to allow movement of at least one of first half 708 or second half 710 in more than one axis. By allowing movement in more than one axis, a distance between first half 708 and second half 710 at a first end of charge support 706 can be different than a distance between first half 708 and second half 710 at a second end of charge support 706.

Plurality of actuators 714 is connected to backside 713 of forming tool 702. Plurality of actuators 714 is aligned in the longitudinal direction of forming tool 702. Plurality of actuators 714 is configured to move forming surface 712 in direction 720 towards composite charge 704. As can be seen in view 700, forming surface 712 has a variable cross-section. In view 700, first end 722 has a smaller cross-section than second end 724.

Figure 8A:
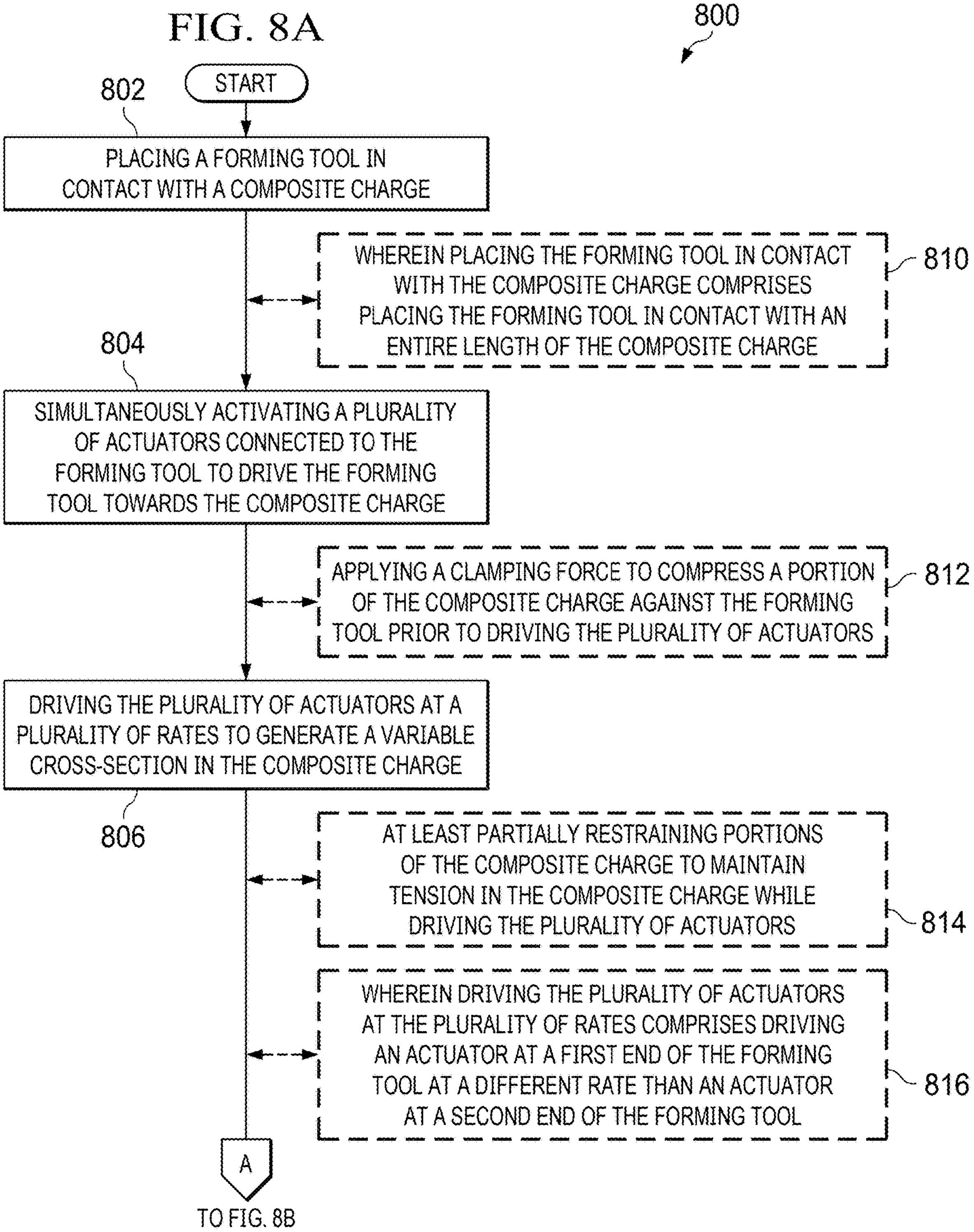
FIGS. 8A and 8B are a flowchart of a method of punch forming a composite charge in accordance with an illustrative embodiment.
Figure 8B:
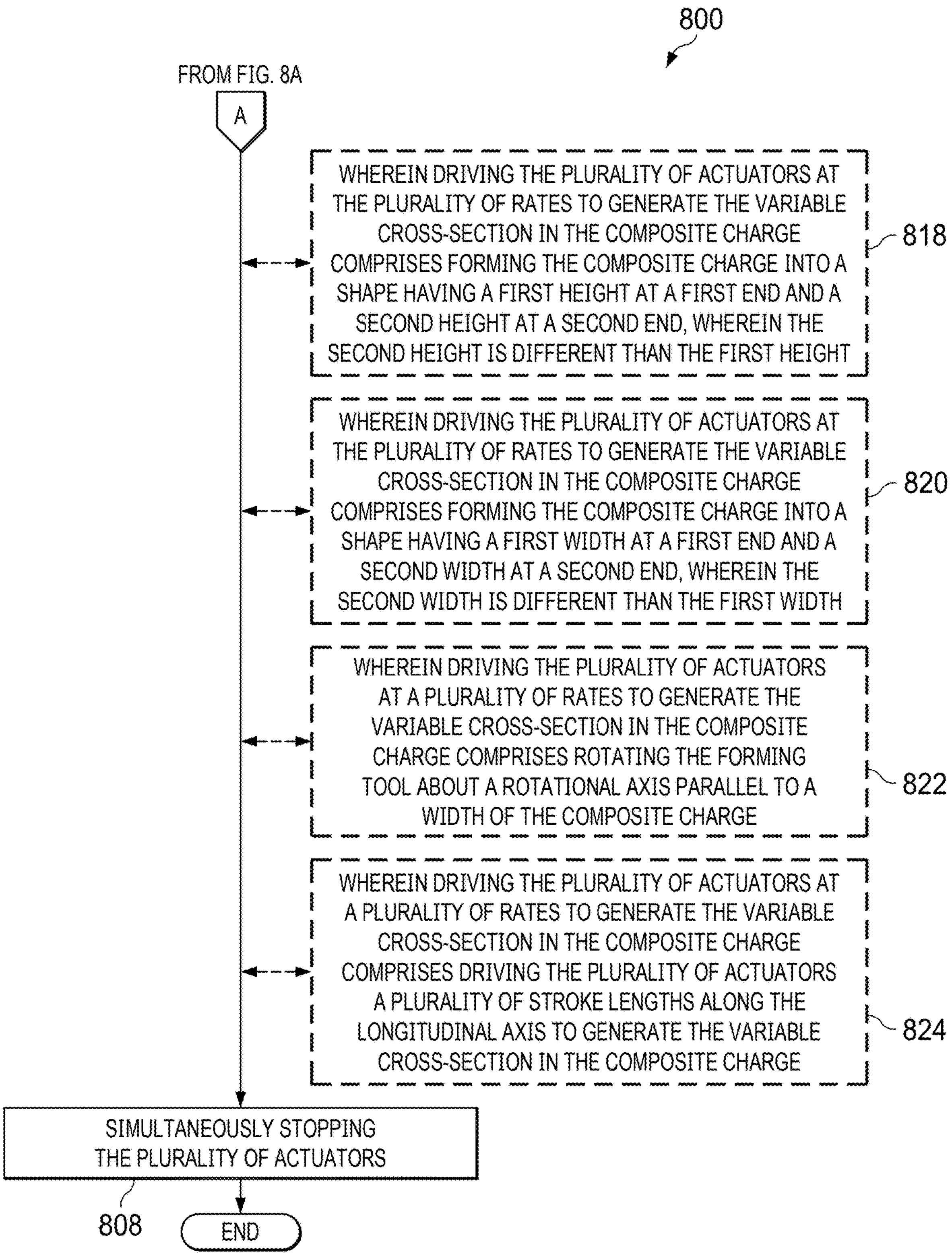

Turning now to FIGS. 8A and 8B, a flowchart of a method of punch forming a composite charge is depicted in accordance with an illustrative embodiment. Method 800 can be used to form a composite part of aircraft 100 of FIG. 1. Method 800 can be performed using forming tool 202 of FIG. 2. Method 800 can be performed on composite charge 246 of FIG. 2. Method 800 can produce longitudinal component 300 of FIG. 3. Method 800 can be performed using plurality of actuators 402 and forming tool 404 of FIGS. 4 and 5. Method 800 can be performed using forming tool 602 of FIG. 6. Method 800 can be performed on composite charge 704 using forming tool 702 of FIG. 7.

Method 800 places a forming tool in contact with a composite charge (operation 802). Method 800 simultaneously activates a plurality of actuators connected to the forming tool to drive the forming tool towards the composite charge (operation 804). Method 800 drives the plurality of actuators at a plurality of rates to generate a variable cross-section in the composite charge (operation 806). Method 800 simultaneously stops the plurality of actuators (operation 808). Afterwards, method 800 terminates.

In some illustrative examples, placing the forming tool in contact with the composite charge comprises placing the forming tool in contact with an entire length of the composite charge (operation 810). In some illustrative examples, placing the forming tool in contact with the composite charge comprises placing the center of the forming tool in contact with a center of the composite charge.

In some illustrative examples, method 800 applies a clamping force to compress a portion of the composite charge against the forming tool prior to driving the plurality of actuators (operation 812). In some illustrative examples, the clamping force clamps a center of the composite charge to a center of the forming tool. In some illustrative examples, the clamping force can be applied by an inflatable bladder.

In some illustrative examples, method 800 at least partially restrains portions of the composite charge to maintain tension in the composite charge while driving the plurality of actuators (operation 814). In some illustrative examples, at least partially restraining the portions of the composite charge comprises compressing opposite edges of the composite charge against the forming tool. In some illustrative examples, at least partially restraining the portions of the composite charge comprises compressing opposite edges of the composite charge against a charge support under the composite charge. In some illustrative examples, the composite charge is at least partially restrained by a mechanical clamp. In some illustrative examples, the composite charge is at least partially restrained by an inflatable bladder.

In some illustrative examples, driving the plurality of actuators at the plurality of rates comprises driving an actuator at a first end of the forming tool at a different rate than an actuator at a second end of the forming tool (operation 816). The end of the forming tool with a larger cross-section is associated with an actuator operated at a faster rate. In some illustrative examples, the first end of the forming too has a larger cross-section and driving the plurality of actuators comprises driving an actuator at a first end of the forming tool at a faster rate than an actuator at a second end of the forming tool.

In some illustrative examples, driving the plurality of actuators at the plurality of rates to generate the variable cross-section in the composite charge comprises forming the composite charge into a shape having a first height at a first end and a second height at a second end, wherein the second height is different than the first height (operation 818). An actuator forming a larger height into a composite charge will operate at a faster rate than an actuator forming a smaller height into the composite charge. In some illustrative examples, the first height is greater than the second height.

In these illustrative examples, the actuator forming the first height into the first end of the composite charge operates at a faster rate than an actuator forming the second height into the second end of the composite charge.

In some illustrative examples, driving the plurality of actuators at the plurality of rates to generate the variable cross-section in the composite charge comprises forming the composite charge into a shape having a first width at a first end and a second width at a second end, wherein the second width is different than the first width (operation 820). In some illustrative examples, an actuator forming a larger width into a composite charge will operate at a faster rate than an actuator forming a smaller width into the composite charge.

In some illustrative examples, driving the plurality of actuators at a plurality of rates to generate the variable cross-section in the composite charge comprises rotating the forming tool about a rotational axis parallel to a width of the composite charge (operation 822). In some illustrative examples, rotating the forming tool comprises pivoting the forming tool such that an end of the forming tool with a larger cross-section moves a farther distance than an opposite end of the forming tool with a smaller cross-section. The illustrative examples provide some wrinkle reduction by generating a type of torsion to the charge through the rotation of the forming tool. The torsion is generated by the different rates of the actuators.

In some illustrative examples, the plurality of actuators is distributed along a longitudinal axis of the forming tool. In some illustrative examples, driving the plurality of actuators at a plurality of rates to generate the variable cross-section in the composite charge comprises driving the plurality of actuators a plurality of stroke lengths along the longitudinal axis to generate the variable cross-section in the composite charge (operation 824).

Figure 9:
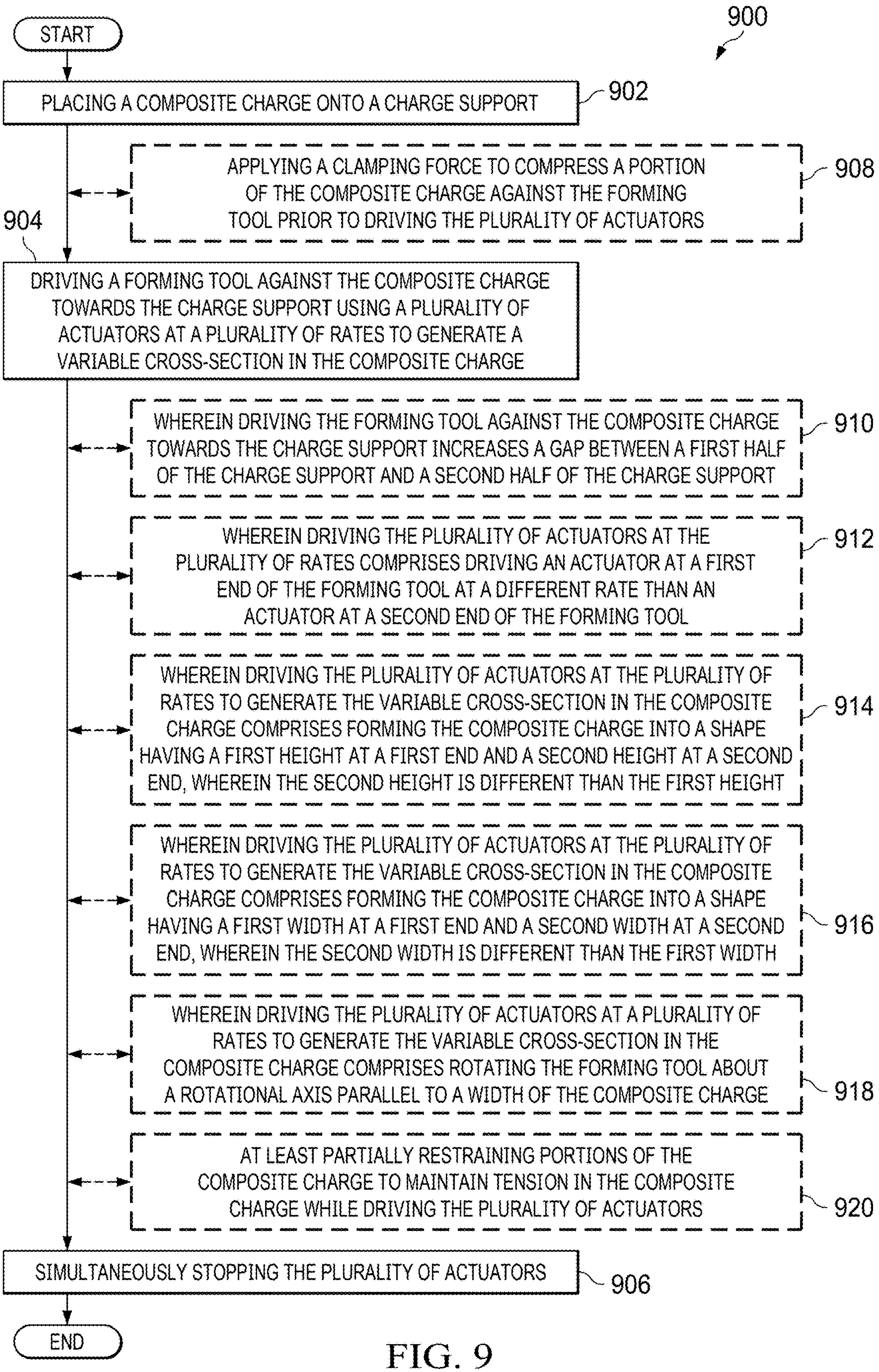
FIG. 9 is a flowchart of a method of punch forming a composite charge in accordance with an illustrative embodiment.

Turning now to FIG. 9, a flowchart of a method of punch forming a composite charge is depicted in accordance with an illustrative embodiment. Method 900 can be used to form a composite part of aircraft 100 of FIG. 1. Method 900 can be performed using forming tool 202 of FIG. 2. Method 900 can be performed on composite charge 246 of FIG. 2. Method 900 can produce longitudinal component 300 of FIG. 3. Method 900 can be performed using plurality of actuators 402 and forming tool 404 of FIGS. 4 and 5. Method 900 can be performed using forming tool 602 of FIG. 6. Method 900 can be performed on composite charge 704 using forming tool 702 of FIG. 7.

Method 900 places a composite charge onto a charge support (operation 902). Method 900 drives a forming tool against the composite charge towards the charge support using a plurality of actuators at a plurality of rates to generate a variable cross-section in the composite charge (operation 904). Method 900 simultaneously stops the plurality of actuators (operation 906). Afterwards, method 900 terminates.

In some illustrative examples, method 900 applies a clamping force to compress a portion of the composite charge against the forming tool prior to driving the plurality of actuators (operation 908).

In some illustrative examples, driving the forming tool against the composite charge towards the charge support increases a gap between a first half of the charge support and a second half of the charge support (operation 910).

In some illustrative examples, driving the plurality of actuators at the plurality of rates comprises driving an actuator at a first end of the forming tool at a different rate than an actuator at a second end of the forming tool (operation 912).

In some illustrative examples, driving the plurality of actuators at the plurality of rates to generate the variable cross-section in the composite charge comprises forming the composite charge into a shape having a first height at a first end and a second height at a second end, wherein the second height is different than the first height (operation 914).

In some illustrative examples, driving the plurality of actuators at the plurality of rates to generate the variable cross-section in the composite charge comprises forming the composite charge into a shape having a first width at a first end and a second width at a second end, wherein the second width is different than the first width (operation 916).

In some illustrative examples, driving the plurality of actuators at a plurality of rates to generate the variable cross-section in the composite charge comprises rotating the forming tool about a rotational axis parallel to a width of the composite charge (operation 918).

In some illustrative examples, method 900 at least partially restrains portions of the composite charge to maintain tension in the composite charge while driving the plurality of actuators (operation 920). In some illustrative examples, at least partially restraining the portions of the composite charge comprises compressing opposite edges of the composite charge against the forming tool. In some illustrative examples, at least partially restraining the portions of the composite charge comprises compressing opposite edges of the composite charge against a charge support under the composite charge. In some illustrative examples, the composite charge is at least partially restrained by a mechanical clamp. In some illustrative examples, the composite charge is at least partially restrained by an inflatable bladder.

Figure 10:
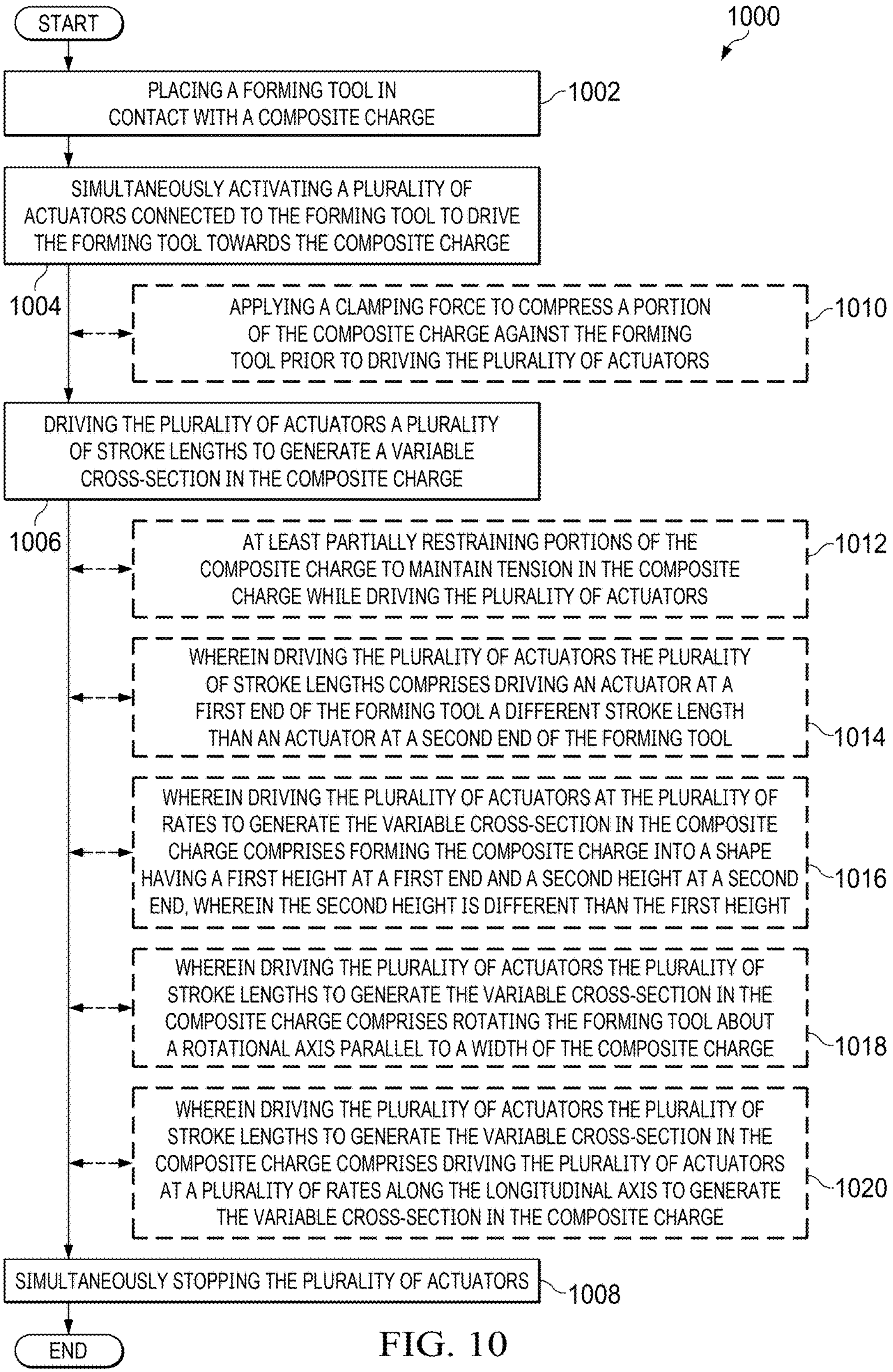
FIG. 10 is a flowchart of a method of punch forming a composite charge in accordance with an illustrative embodiment.

Turning now to FIG. 10, a flowchart of a method of punch forming a composite charge is depicted in accordance with an illustrative embodiment. Method 1000 can be used to form a composite part of aircraft 100 of FIG. 1. Method 1000 can be performed using forming tool 202 of FIG. 2. Method 1000 can be performed on composite charge 246 of FIG. 2. Method 1000 can produce longitudinal component 300 of FIG. 3. Method 1000 can be performed using plurality of actuators 402 and forming tool 404 of FIGS. 4 and 5. Method 1000 can be performed using forming tool 602 of FIG. 6. Method 1000 can be performed on composite charge 704 using forming tool 702 of FIG. 7.

Method 1000 places a forming tool in contact with a composite charge (operation 1002). Method 1000 simultaneously activates a plurality of actuators connected to the forming tool to drive the forming tool towards the composite charge (operation 1004). Method 1000 drives the plurality of actuators a plurality of stroke lengths to generate a variable cross-section in the composite charge (operation 1006). Method 1000 simultaneously stopping the plurality of actuators (operation 1008). Afterwards, method 1000 terminates.

In some illustrative examples, method 1000 applies a clamping force to compress a portion of the composite charge against the forming tool prior to driving the plurality of actuators (operation 1010). In some illustrative examples, at least partially restraining portions of the composite charge to maintain tension in the composite charge while driving the plurality of actuators (operation 1012).

In some illustrative examples, method 1000 drives the plurality of actuators the plurality of stroke lengths comprises driving an actuator at a first end of the forming tool a different stroke length than an actuator at a second end of the forming tool (operation 1014). In some illustrative examples, driving the plurality of actuators the plurality of stroke lengths to generate the variable cross-section in the composite charge comprises forming the composite charge into a shape having a first height at a first end and a second height at a second end, wherein the second height is different than the first height (operation 1016).

In some illustrative examples, driving the plurality of actuators the plurality of stroke lengths to generate the variable cross-section in the composite charge comprises rotating the forming tool about a rotational axis parallel to a width of the composite charge (operation 1018).

In some illustrative examples, the plurality of actuators is distributed along a longitudinal axis of the forming tool. In some illustrative examples, driving the plurality of actuators the plurality of stroke lengths to generate the variable cross-section in the composite charge comprises driving the plurality of actuators at a plurality of rates along the longitudinal axis to generate the variable cross-section in the composite charge (operation 1020).

As used herein, the phrase "at least one of," when used with a list of items, means different combinations of one or more of the listed items may be used and only one of each item in the list may be needed. For example, "at least one of item A, item B, or item C," may include, without limitation, item A, item A and item B, or item B. This example also may include item A, item B, and item C, or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 810 through operation 824 may be optional. For example, operation 908 through operation 920 may be optional. As another example, operation 1010 through operation 1020 may be optional.

Figure 11:
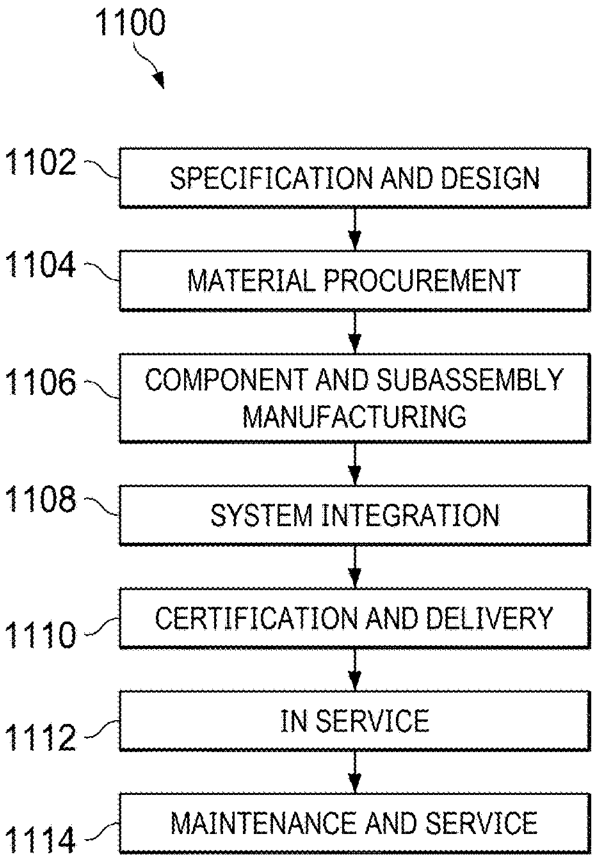
FIG. 11 is an illustration of an aircraft manufacturing and service method in a form of a block diagram in accordance with an illustrative embodiment.
Figure 12:
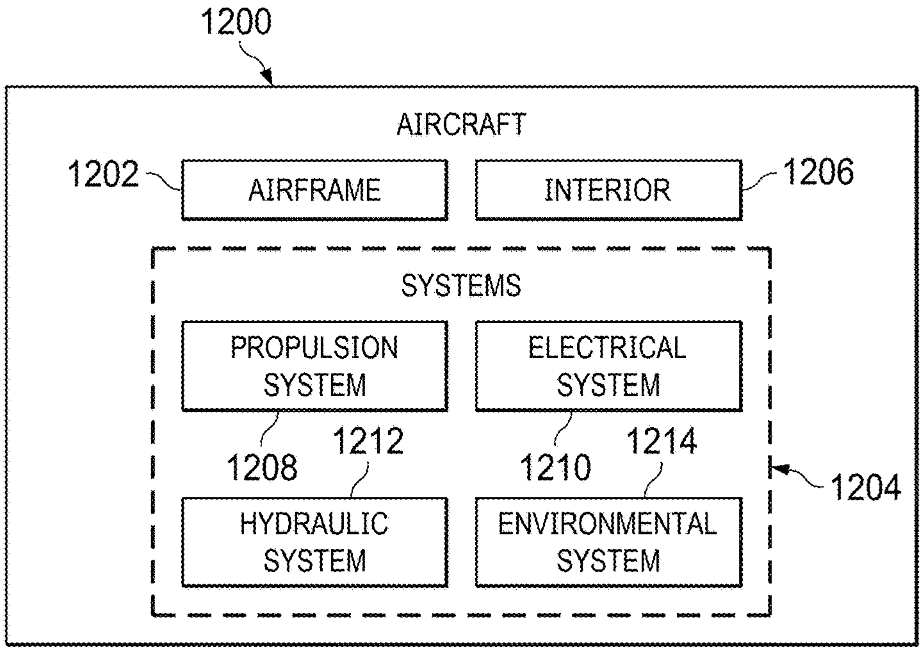
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method in a form of a block diagram is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft in a form of a block diagram is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

The illustrative examples provide methods and systems for punch forming longitudinal components with a tapered cross-section. The illustrative examples provide methods of punch forming taper cross-section composite stringers. The illustrative examples use variable rate actuators to drive a forming die and end the stroke of each actuator at the same time.

The illustrative examples place a composite charge into a punch former. The composite charge can be a net shape or can have a different shape that will result in a manufacturing excess. The illustrative examples use variable rate forming actuators to push the forming die down so that all portions of the face of the forming die stop at the same time. The actuators start at the same time and end at the same time, but cover different distances. The illustrative examples provide some wrinkle reduction by generating a type of torsion to the charge. The torsion is generated by the different rates of the actuators.

The methods and system of the illustrative examples can be used on longitudinal components with a twist, a curvature, or a joggle. Determine each actuator position and speed needed to end all of the actuator strokes at the same time.

In some illustrative examples, a number of release layers are placed on a charge support. The composite charge is placed on top of the number of release layers. The composite charge is aligned on the charge support to ensure the composite charge is centered. In some illustrative examples, a number of release layers is placed on top of the composite charge.

In some illustrative examples, the composite charge can be heated prior to punch forming. The forming die is lowered until the forming surface contacts the composite charge. In some illustrative examples, a series of inflatable bladders are present between the forming tool and the charge support. In some illustrative examples, the inflatable bladders are inflated to apply compression to the composite charge to clamp the composite charge and maintain tension during forming.

The composite charge is formed at variable rate until completion. In some illustrative examples, inflated bladders within the assembly can relieve pressure build-up during the forming. The composite charge is held for a rest time. After a rest time, the formed composite charge is removed from the assembly.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of punch forming a composite charge comprising:

placing a forming tool in contact with a composite charge;

simultaneously activating a plurality of actuators connected to the forming tool to drive the forming tool towards the composite charge, wherein a shape of the forming tool remains constant while activating the plurality of actuators;

driving the plurality of actuators at a plurality of rates to generate a variable cross-section in the composite charge by rotating the forming tool about a rotational axis parallel to a width of the composite charge, wherein each rate of the plurality of rates is independently set based on the variable cross-section; and simultaneously stopping the plurality of actuators.

2. The method of claim 1, wherein driving the plurality of actuators at the plurality of rates comprises driving an actuator at a first end of the forming tool at a different rate than an actuator at a second end of the forming tool.

3. The method of claim 1, wherein driving the plurality of actuators at the plurality of rates to generate the variable cross-section in the composite charge comprises forming the composite charge into a shape having a first height at a first end and a second height at a second end, wherein the second height is different than the first height.

4. The method of claim 1, wherein driving the plurality of actuators at the plurality of rates to generate the variable cross-section in the composite charge comprises forming the composite charge into a shape having a first width at a first end and a second width at a second end, wherein the second width is different than the first width.

5. The method of claim 1, wherein placing the forming tool in contact with the composite charge comprises placing the forming tool in contact with an entire length of the composite charge.

6. The method of claim 1, further comprising:

applying a clamping force to compress a portion of the composite charge against the forming tool prior to driving the plurality of actuators.

7. The method of claim 1, further comprising:

at least partially restraining portions of the composite charge to maintain tension in the composite charge while driving the plurality of actuators.

8. The method of claim 1, wherein the plurality of actuators is distributed along a longitudinal axis of the forming tool, and wherein driving the plurality of actuators at a plurality of rates to generate the variable cross-section in the composite charge comprises driving the plurality of actuators a plurality of stroke lengths along the longitudinal axis to generate the variable cross-section in the composite charge.

9. The method of claim 1, wherein the variable cross-section comprises a width of the composite charge perpendicular to a longitudinal axis of the composite charge.

10. The method of claim 1, wherein the forming tool comprises a forming surface opposite a backside and wherein the forming surface is a first distance from the backside at a first end of the forming tool and the forming surface is a second distance from the backside at a second end of the forming tool, the first distance different from the second distance.

11. The method of claim 1, wherein the rotational axis is perpendicular to both a longitudinal axis of the forming tool and a direction of movement of the forming tool.

12. The method of claim 1, further comprising:

placing a composite charge onto a charge support.

13. A method of punch forming a composite charge comprising:

placing a forming tool in contact with a composite charge;

simultaneously activating a plurality of actuators connected to the forming tool to drive the forming tool towards the composite charge, wherein a shape of the forming tool remains constant while activating the plurality of actuators;

driving the plurality of actuators a plurality of stroke lengths to generate a variable cross-section in the composite charge by rotating the forming tool about a rotational axis parallel to a width of the composite charge and perpendicular to a longitudinal axis of the forming tool; and simultaneously stopping the plurality of actuators.

14. The method of claim 13, wherein driving the plurality of actuators the plurality of stroke lengths comprises driving an actuator at a first end of the forming tool a different stroke length than an actuator at a second end of the forming tool.

15. The method of claim 13, wherein driving the plurality of actuators the plurality of stroke lengths to generate the variable cross-section in the composite charge comprises forming the composite charge into a shape having a first height at a first end and a second height at a second end, wherein the second height is different than the first height.

16. The method of claim 13, further comprising:

applying a clamping force to compress a portion of the composite charge against the forming tool prior to driving the plurality of actuators.

17. The method of claim 13, further comprising:

at least partially restraining portions of the composite charge to maintain tension in the composite charge while driving the plurality of actuators.

18. The method of claim 13, wherein driving the plurality of actuators the plurality of stroke lengths to generate the variable cross-section in the composite charge comprises rotating the forming tool about a rotational axis parallel to a width of the composite charge.

19. The method of claim 13, wherein the plurality of actuators is distributed along a longitudinal axis of the forming tool, and wherein driving the plurality of actuators the plurality of stroke lengths to generate the variable cross-section in the composite charge comprises driving the plurality of actuators at a plurality of rates along the longitudinal axis to generate the variable cross-section in the composite charge.

20. A method of punch forming a composite charge, the method comprising:

placing a composite charge onto a charge support;

driving a forming tool against the composite charge towards the charge support by simultaneously activating a plurality of actuators at a plurality of rates to generate a variable cross-section in the composite charge by rotating the forming tool about a rotational axis parallel to a width of the composite charge, wherein each rate of the plurality of rates is independently set based on the variable cross-section and a shape of the forming tool remains constant while activating the plurality of actuators; and stopping the plurality of actuators.

21. The method of claim 20, wherein driving the forming tool against the composite charge towards the charge support increases a gap between a first half of the charge support and a second half of the charge support.

22. The method of claim 20, wherein driving the plurality of actuators at the plurality of rates comprises driving an actuator at a first end of the forming tool at a different rate than an actuator at a second end of the forming tool.

* * * * *